United States Patent
Soeiro et al.

(10) Patent No.: US 10,277,144 B2
(45) Date of Patent: Apr. 30, 2019

(54) FOUR-LEVEL POWER CONVERTER

(71) Applicant: ABB Schweiz AG, Baden (CH)

(72) Inventors: Thiago-Batista Soeiro, Birr (CH); Francisco Canales, Baden-Dättwil (CH)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 15/988,416

(22) Filed: May 24, 2018

(65) Prior Publication Data

US 2018/0269803 A1  Sep. 20, 2018

Related U.S. Application Data

(63) Continuation of application No. PCT/EP2016/078491, filed on Nov. 23, 2016.

(30) Foreign Application Priority Data

Nov. 24, 2015 (EP) .................... 15196063

(51) Int. Cl.
*H02M 3/158* (2006.01)
*H02M 7/217* (2006.01)
(Continued)

(52) U.S. Cl.
CPC ........... *H02M 7/487* (2013.01); *H02M 3/158* (2013.01); *H02M 7/5387* (2013.01); *H02M 7/217* (2013.01); *H02M 7/219* (2013.01)

(58) Field of Classification Search
CPC ........ H02M 7/217; H02M 7/219; H02M 7/42; H02M 7/44; H02M 7/48; H02M 7/483;
(Continued)

(56) References Cited

U.S. PATENT DOCUMENTS 4,135,235 A    1/1979  Baker
5,572,418 A *  11/1996  Kimura ............... H02M 7/4826
                                               363/132
(Continued)

FOREIGN PATENT DOCUMENTS

CN    102769404 A    11/2012
CN    103248253 A     8/2013
(Continued)

OTHER PUBLICATIONS

European Patent Office, International Search Report & Written Opinion issued in corresponding Application No. PCT/EP2016/078491, dated Jan. 31, 2017, 11 pp.
(Continued)

*Primary Examiner* — Alex Torres-Rivera
*Assistant Examiner* — Ivan Laboy
(74) *Attorney, Agent, or Firm* — J. Bruce Schelkopf; Taft Stettinius & Hollister LLP

(57) ABSTRACT

The present invention is concerned with a four-level voltage source converter topology including two intermediate converter branches connecting two intermediate voltage levels to a load terminal, and including a interconnect switch coupling the two intermediate branches. The interconnect switch replaces two controlled switches present in corresponding four-level prior art topologies. The four-level converter thus requires, for a full bidirectional implementation, only five active switches. The reduced number of active switches/gate drivers and the four available output voltage levels make this solution interesting for lower cost power electronics with improved reliability, good power quality and minimized filtering requirement.

17 Claims, 7 Drawing Sheets

(51) Int. Cl.
*H02M 7/219* (2006.01)
*H02M 7/487* (2007.01)
*H02M 7/5387* (2007.01)

(58) Field of Classification Search
CPC ........ H02M 7/487; H02M 7/49; H02M 7/493; H02M 7/537; H02M 7/5387; H02M 7/5388; H02M 7/797
See application file for complete search history.

(56) References Cited

U.S. PATENT DOCUMENTS

| | | | |
|---|---|---|---|
| 6,930,899 B2 | 8/2005 | Bakran et al. | |
| 2010/0219692 A1* | 9/2010 | Flury | H02M 7/487 307/84 |
| 2013/0094267 A1* | 4/2013 | Heo | H02M 7/483 363/132 |
| 2014/0376287 A1* | 12/2014 | Narimani | H02M 3/07 363/60 |
| 2016/0218637 A1* | 7/2016 | Fan | H02M 7/483 |
| 2017/0099013 A1* | 4/2017 | Martini | H02M 7/487 |
| 2017/0302195 A1* | 10/2017 | Ye | H02M 7/483 |
| 2018/0062537 A1* | 3/2018 | Wang | H02M 1/08 |

FOREIGN PATENT DOCUMENTS

| | | | |
|---|---|---|---|
| EP | 0481304 A2 | 4/1992 | |
| EP | 0727870 A2 | 8/1996 | |
| EP | 2706653 A1 | 3/2014 | |
| JP | 2012253927 A * | 12/2012 | ............ H02M 7/487 |
| WO | 2011132206 A1 | 10/2011 | |

OTHER PUBLICATIONS

European Patent Office, Extended Search Report issued in corresponding Application No. 15196063.0, dated Jun. 1, 2016, 8 pp.

Abu-Rub et al., "Medium-Voltage Multilevel Converters—State of the Art, Challenges, and Requirements in Industrial Applications," IEEE Transactions on Industrial Electronics, vol. 57, No. 8, Aug. 2010, pp. 2581-2596.

Akagi et al., "A 6.6-kV Transformerless STATCOM Based on a Five-Level Diode-Clamped PWM Converter: System Design and Experimentation of a 200-V 10-kVA Laboratory Model," IEEE Transactions on Industry Applications, vol. 44, No. 2, Mar./Apr. 2008, pp. 672-680.

Brückner et al., "The Active NPC Converter and Its Loss-Balancing Control," IEEE Transactions on Industrial Electronics, vol. 52, No. 3, Jun. 2005, pp. 855-868.

Kouro et al., "Recent Advances and Industrial Applications of Multilevel Converters," IEEE Transactions on Industrial Electronics, vol. 57, No. 8, Aug. 2010, pp. 2553-2580.

Lezana et al., "Survey on Fault Operation on Multilevel Inverters," IEEE Transactions on Industrial Electronics, vol. 57, No. 7, Jul. 2010, pp. 2207-2218.

Nabae et al., "A New Neutral-Point-Clamped PWM Inverter," IEEE Transactions on Industry Applications, vol. 1A-17, No. 5, Sep./Oct. 1981, pp. 518-523.

Sinha et al., "A Four-Level Inverter Based Drive with a Passive Front End," IEEE Transactions on Power Electronics, vol. 15, No. 2, Mar. 2000, pp. 285-294.

Wang, "Four-Level Neutral Point Clamped Converter with Reduced Switch Count," 2008 IEEE Power Electronics Specialists Conference, Jun. 15-19, 2008, pp. 2626-2632.

* cited by examiner

FOUR-LEVEL POWER CONVERTER

FIELD OF THE INVENTION

The invention relates to the field of power electronic converters and specifically to a four-level inverter circuit topology.

BACKGROUND OF THE INVENTION

Multilevel converters, particularly Neutral-Point-Clamped Converters (NPCC), are widely used for single- and three-phase bi-directional grid-connected applications in the medium voltage (MV) range, including rolling mills, fans, pumps, marine appliances, mining, traction, uninterrupted power supply (UPS) and renewable energy integration. Attractive characteristics of multilevel converters include relatively low harmonic amplitudes at the converter input and output terminals, reduced switching losses, as well as reduced electromagnetic interference. On the other hand, the number of switches connected in series increases along with the number of converter levels. Accordingly, the total converter cost increases and so do the semiconductor conduction losses. Multilevel converter topologies therefore are most suitable for medium to high voltage and high power applications for which no high-voltage blocking semiconductors are available to date.

In order to reduce the cost of power electronic converters, circuit topologies with low semiconductor part counts are favoured, which also may improve both the system power density (low weight converter) and power efficiency. An exemplary four-level Active Neutral-Point-Clamped Converter (ANPCC) circuit topology with a reduced number of diodes is disclosed in WO 2011/132206 A1.

EP 0 727 870 A2 and EP 0 481 304 A2 relate to multi-level converters with converter branches comprising several controllable switches connected in series.

CN 102 769 404 A shows several converter bridges, each of which comprises four converter branches with one switch, which do not have intermediate connections with each other.

DESCRIPTION OF THE INVENTION

It is an objective of the invention to simplify the topology and to correspondingly lower the manufacturing costs of a four-level power converter. This objective is achieved by a four level power converter according to the independent claim. Preferred embodiments are evident from the dependent patent claims.

According to the invention, a four-level voltage source converter (VSC) topology has two intermediate converter branches connecting two intermediate voltage levels to a load terminal, and an interconnect switch interconnecting the two intermediate branches. The interconnect switch replaces two controlled switches present in corresponding four-level prior art topologies. The four-level converter thus requires, for a full bidirectional implementation, only five active switches. The reduced number of active switches/gate drivers and the four available output voltage levels make this solution interesting for lower cost power electronics with improved reliability, good power quality and minimized filtering requirement.

Specifically, a four-level full power factor voltage source power converter has a DC link including a series connection of three or four capacitors connecting a first and a second input DC terminal and defining a first and a second DC intermediate terminal with a respective first and second intermediate voltage level. The capacitors may be seen as voltage-dividing capacitors.

The four-level converter has a single-phase bridge for connecting at will one of four voltage levels to a load or output AC terminal and comprises
a first converter branch connecting the first input terminal to the load terminal;
a first intermediate branch including a controllable first intermediate branch switch and a first intermediate branch diode, which are interconnected with each other at a first connection point and which connect the first intermediate terminal to the load terminal;
a second converter branch connecting the load terminal to the second input terminal, and
a second intermediate branch including a controllable second intermediate branch switch and a second intermediate branch diode, which are interconnected with each other at a second connection point and which connect the load terminal to the second intermediate terminal.

The four-level power converter further comprises a controllable intermediate-branch interconnect switch to connect the second connection point to the first connection point.

The controllable interconnect switch may be connected to the first connection point situated between the first switch and the first diode in the first intermediate branch and may be connected to the second connection point situated between the second switch and the second diode in the second intermediate branch.

According to an embodiment of the invention, in the first intermediate branch the first controllable switch and the first diode are connected in series and provide the first connection point between them. Furthermore, in the second intermediate branch the second controllable switch and the second diode are connected in series and provide the second connection point between them. Thus, the two intermediate branch switches and the two intermediate branch diodes may be connected with each other with the interconnect switch in the form of an H.

It has to be noted that the first diode and the second diode may be connected to the load terminal, that the first controllable switch may be connected to the first intermediate terminal and that the second controllable switch may be connected to the second intermediate terminal.

According to an embodiment of the invention, the first branch, the first intermediate branch, the second branch and the second intermediate branch are interconnected at the load terminal. In other words, the branches may be interconnected with each other in a star-like manner. It has to be noted that the branches do not share common members, i.e. there are no diodes, switches, etc., which belong to two of the branches.

According to an embodiment of the invention, the first and second intermediate branches include solely the first controllable switch and the second controllable switch as controllable switches. It may be that the first and second intermediate branch include no further controllable switches in addition to, or in excess of, the respective intermediate branch switch.

According to an embodiment of the invention, the first intermediate branch comprises a further diode connected antiparallel to the first controllable switch and/or connected in reverse direction to the first diode. Furthermore, the second intermediate branch comprises a further diode connected antiparallel to the second controllable switch and/or connected in reverse direction to the second diode.

According to an embodiment of the invention, the first controllable switch ($S_2$) and the controllable interconnect switch ($S_5$) are supplied by the same gate drive power supply. Four example, when the single phase bridge comprises exactly five controllable switches, the single phase bridge and/or the power converter may comprise only four gate drive power supplies for providing auxiliary power to five gate drive circuits. The controllable first intermediate branch switch and the controllable interconnect switch may share a common power supply, which further reduces the number of converter components.

According to an embodiment of the invention, the first and second converter branch of the four-level converter each include a controllable switch for inverter operation.

According to an embodiment of the invention, the first and second converter branch each include a diode. The respective diode may be connected antiparallel to the respective controllable switch of the first and second converter branch.

According to an embodiment of the invention, each of the first and second converter branch include solely one controllable switch and/or solely one diode.

The invention is further directed to a three-phase power converter for bi-directional power exchange with a power grid, comprising three single-phase bridges connected in parallel to a same DC link of the three-phase converter. Such a three-phase converter may be beneficially used in static synchronous compensator (Statcom) applications.

BRIEF DESCRIPTION OF THE DRAWINGS

The subject matter of the invention will be explained in more detail in the following text with reference to preferred exemplary embodiments which are illustrated in the attached drawings, of which.

DETAILED DESCRIPTION OF PREFERRED EMBODIMENTS

Figure 1:
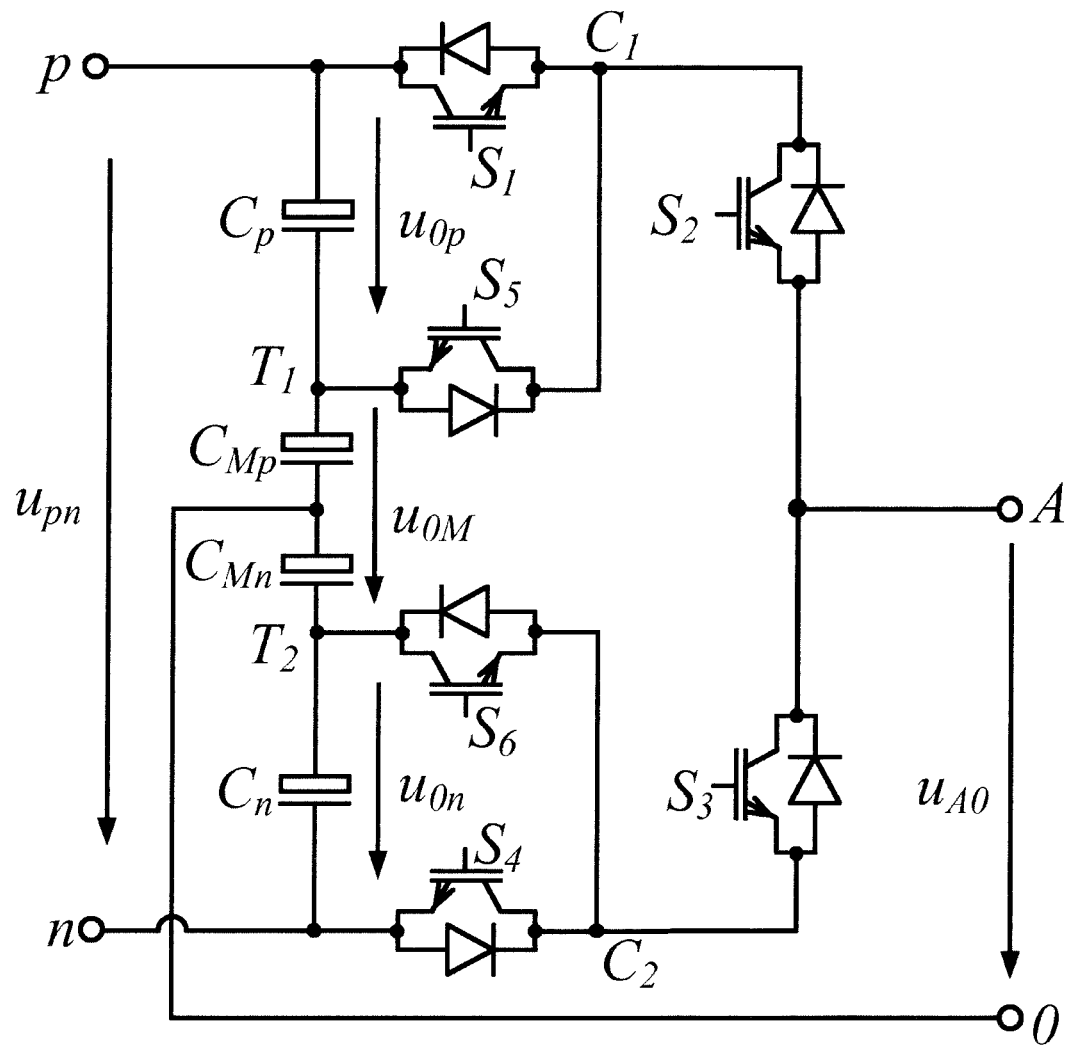
FIG. 1 depicts a prior-art Active Neutral-Point-Clamped Converter circuit topology.

FIG. 1 depicts a prior-art Active Neutral-Point-Clamped Converter (ANPCC) circuit topology as disclosed in WO 2011/132206 A1. The converter circuit connects a first, or positive, input DC terminal p and a second, or negative, input DC terminal n to a load terminal A. The circuit includes four voltage-dividing capacitors $C_p$, $C_{Mp}$, $C_{Mn}$, $C_n$ electrically connected in series and arranged between the input DC terminals, with a first capacitor $C_p$ connected to the positive input DC terminal p, a second capacitor $C_n$ connected to the negative input DC terminal n, and two intermediate capacitors $C_{Mp}$, $C_{Mn}$ connected between the first and second capacitor. A first, or positive, intermediate terminal $T_1$ is defined between the first capacitor $C_p$ and the intermediate capacitors, and a second, or negative, intermediate terminal $T_2$ is defined between the second capacitor $C_n$ and the intermediate capacitors. The capacitances of the voltage dividing capacitors are generally chosen to provide a voltage drop $u_{Op}$, $u_{On}$ of one third of the DC terminal voltage $u_{pn}$ over each of the first and the second capacitor.

A first, or positive, converter branch connects the first input terminal p to the load terminal A and comprises two controlled electronic switches $S_1$, $S_2$ connected in series at a first connection point $C_1$ and capable of conducting current from the first input terminal p to the load terminal A. The switches may be Insulated Gate Bipolar Transistors (IGBTs) or metal oxide semiconductor field-effect transistors (MOSFETs), and include a respective antiparallel diode conducting current from the load to the input terminal. A first intermediate branch connects the first intermediate terminal $T_1$ to the first connection point $C_1$ and conducts current from the first connection point $C_1$ to the first intermediate terminal $T_1$ via switch $S_5$ and in the opposite direction via an antiparallel diode.

A second, or negative, converter branch connects the second input terminal n to the load terminal A and comprises two controlled electronic switches $S_4$, $S_3$ connected in series at a second connection point $C_2$ and capable of conducting current from the load terminal A to the second input terminal n. The switches may be IGBTs or MOSFETs, and include a respective antiparallel diode conducting current from the input to the load terminal. A second intermediate branch connects the second intermediate terminal $T_2$ to the second connection point $C_2$ and conducts current from the intermediate terminal $T_2$ to the connection point $C_2$ via switch $S_6$ and in the opposite direction via an antiparallel diode.

Figure 2:
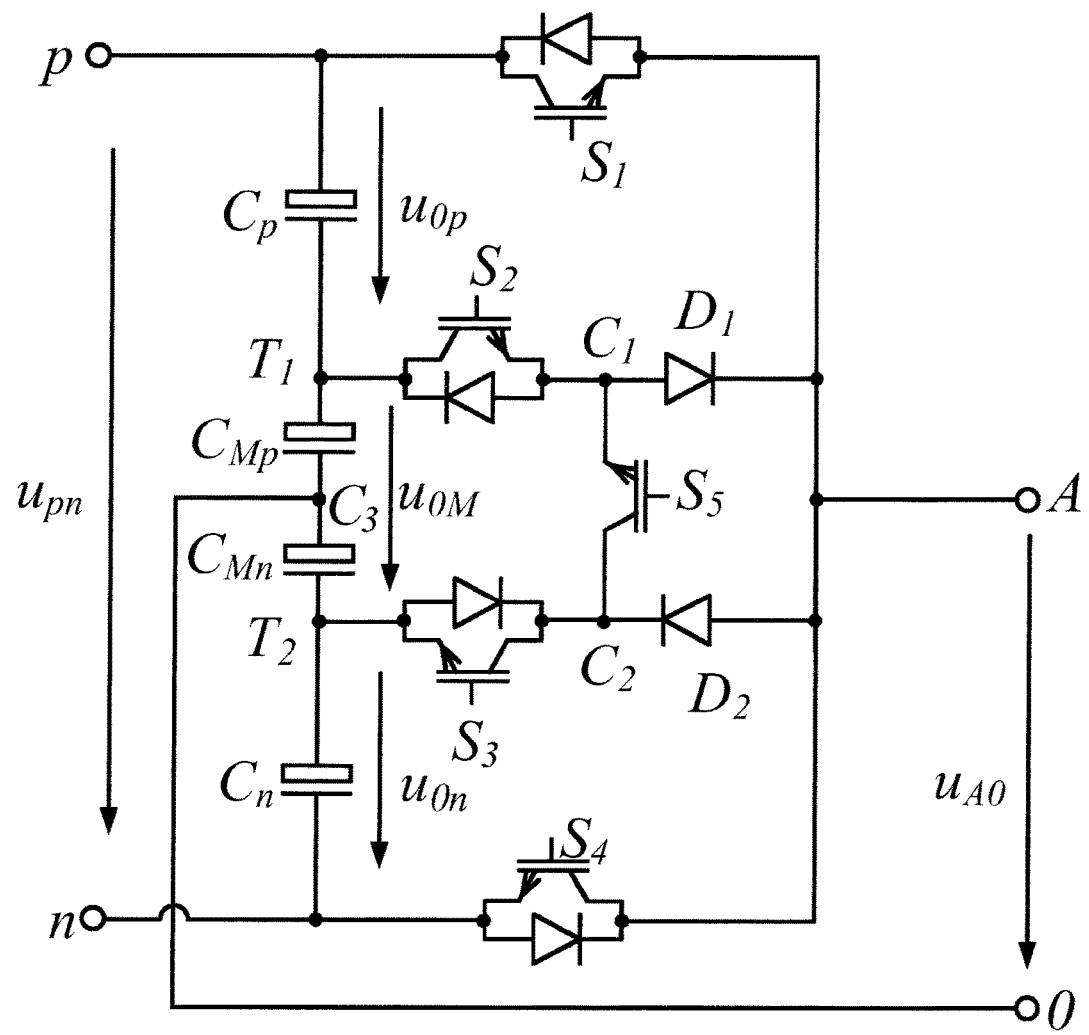
FIG. 2 depicts a four-level converter according to a first embodiment of the invention.

FIG. 2 depicts a four-level converter according to a first embodiment of the invention. As in the case of the prior-art ANPCC of FIG. 1, the converter circuit includes a DC link and a single-phase bridge connecting a first, or positive, input DC terminal p and a second, or negative, input DC terminal n to a load terminal A. A DC power source, for instance with a DC voltage $u_{pn}$ of 1.5 kV for photovoltaic (PV) applications, or an intermediate link fed by a rectifying converter stage may be connected to the input DC terminals, while the load terminal may be connected to an electrical energy distribution grid or to an AC load, for instance a variable speed drive application with a variable frequency of up to 500 Hz.

The DC link includes four voltage-dividing capacitors $C_p$, $C_{Mp}$, $C_{Mn}$, $C_n$ electrically connected in series and arranged between the input DC terminals p, n. A first, or positive, intermediate terminal $T_1$ is defined between the first capacitor $C_p$ and the intermediate capacitors $C_{Mp}$, $C_{Mn}$, and a second, or negative, intermediate terminal $T_2$ is defined between the intermediate capacitors $C_{Mp}$, $C_{Mn}$ and the second capacitor $C_n$.

A first converter branch connects, and conducts current from, the first input DC terminal p to the load terminal A via controllable switch $S_1$, while a second converter branch connects, and conducts current from, the load terminal A to the second input terminal n via controllable switch $S_4$. A first intermediate branch connects the first intermediate terminal $T_1$ to the load terminal A and includes a controllable switch $S_2$ and a first diode $D_1$ connected in series at a first connection point $C_1$. The first intermediate branch may conduct current from the first intermediate terminal $T_1$ to the load terminal A, as well as from the first connection point $C_1$ to the first intermediate terminal $T_1$ via a diode antiparallel to $S_2$. A second intermediate branch connects the second intermediate terminal $T_2$ to the load terminal A and includes a controllable switch $S_3$ and a second diode $D_2$ connected in series at a second connection point $C_2$. The second intermediate branch may conduct current from the load terminal A to the second intermediate terminal $T_2$, as well as from the second intermediate terminal $T_2$ to the second connection point $C_2$ via a diode antiparallel to $S_3$.

The converter according to the invention also includes a controllable interconnect switch $S_5$ connecting, and conducting current from, the second connection point $C_2$ to the first connection point $C_1$. Each of the two intermediate branches only comprises one single controllable switch $S_2$, $S_3$, but no further active switching element. Hence the proposed four-level voltage source converter (VSC) topology requires, for a full bidirectional implementation, only five active switches and six diodes, i.e. one active switch less than the ANPCC four-level converter depicted in FIG. 1. A diode may interconnect the first connection point $C_1$ to the second connection point $C_2$ in antiparallel to the controllable interconnect switch $S_5$.

In a single-phase inverter constructed with the proposed four-level converter the switch states used to synthesize the four output voltage levels $u_{A0}$ for controlling the AC current at the load terminal A are given in the table below. A star "*" in the table denotes that the switch can assume either of "1" and "0". The output voltage level $u_{A0}$ in the last column is based on the assumption that the total voltage $u_{pn}$ across the DC-link is equally shared between the intermediate terminals, i.e. $u_{0p} = u_{0M} = u_{0n} = u_{pn}/3$.

|  | S1 | S2 | S3 | S4 | S5 | uA0 |
| --- | --- | --- | --- | --- | --- | --- |
| Vector(3) | 1 | * | 0 | 0 | 0 | upn/2 |
| Vector(2) | 0 | 1 | 0 | 0 | 1 | upn/6 |
| Vector(1) | 0 | 0 | 1 | 0 | 1 | -upn/6 |
| Vector(0) | 0 | 0 | * | 1 | 0 | -upn/2 |

Additionally, only five gate drive circuits with four isolated auxiliary power supplies are necessary to drive the switches. The switches $S_5$ and $S_2$ may share a common power supply for their respective gate drive, as the two gate drives are permanently on the same potential as defined by the first connection point $C_1$.

The switches $S_1$ and $S_4$ and their antiparallel diodes have to block the full DC-link voltage $u_{pn}$, however they may be modulated to be hard-switched only at one third thereof. All other semiconductor switches need to block only one third of the DC-link voltage $u_{pn}$. In particular, the controllable interconnect switch $S_5$ is implemented by a power semiconductor switch, e.g. an IGBT, of the same type, and specifically of the same blocking voltage capability, as the semiconductor switches of the ANPCC that it does supplant.

The embodiment of FIG. 2 represents a single-phase implementation in which the two intermediate capacitors $C_{Mp}$, $C_{Mn}$ are connected in series at capacitor connection point $C_3$. Accordingly, the voltage levels $u_{A0}$ at the load terminal A are relative to an intermediate voltage level defined at the capacitor connection point $C_3$. The intermediate voltage level preferably is at a level corresponding to half the DC-link voltage $u_{pn}$, which is readily established in case both the intermediate capacitors $C_{Mp}$, $C_{Mn}$ as well as the first and second capacitor $C_p$, $C_n$ respectively have a same capacitance. Specifically, the intermediate voltage level may be on common earth or ground potential.

Figure 3:
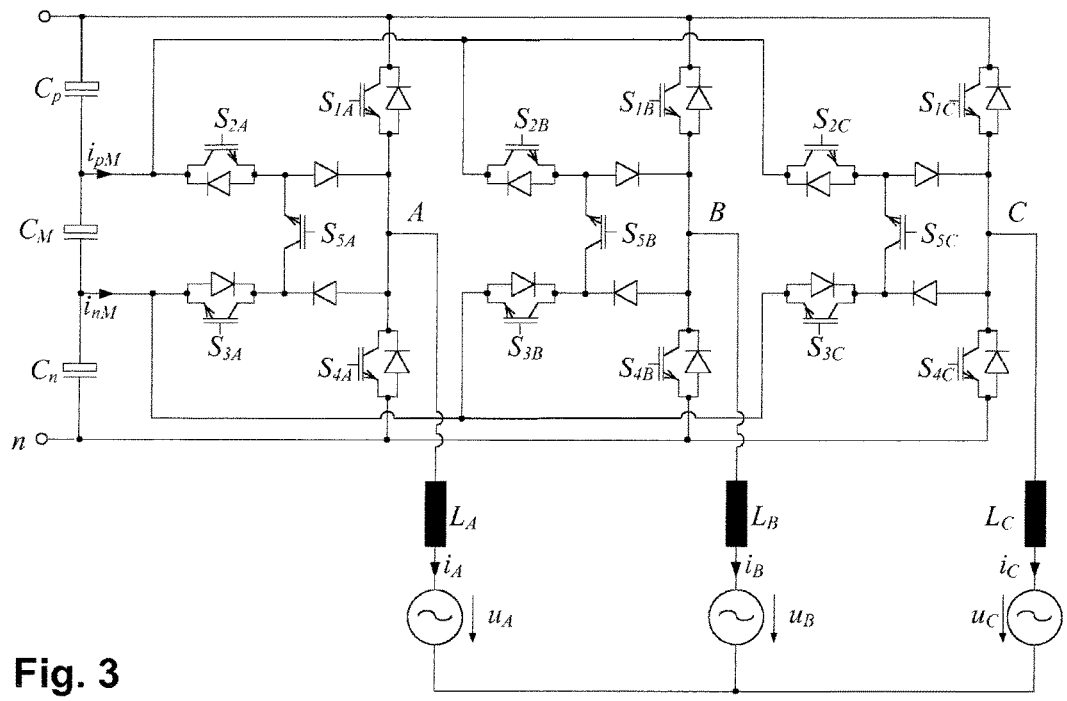
FIG. 3 depicts a three-phase converter implementation.

FIG. 3 depicts a three-phase converter implementation of the invention, with a single DC intermediate link comprising the first and second capacitor $C_p$, $C_n$ as well a unified intermediate capacitor $C_M$ arranged in series between the DC terminals p, n. Here, the unified intermediate capacitor $C_M$ replaces the two intermediate capacitors $C_{Mp}$, $C_{Mn}$ of the first embodiment. Three identical single-phase bridges according to the first embodiment are connected in parallel to the DC intermediate link, with respective output terminals A, B, C being connected, via respective inductors or line filters $L_A$, $L_B$, $L_C$, to a three phase load or power grid.

Figure 4:
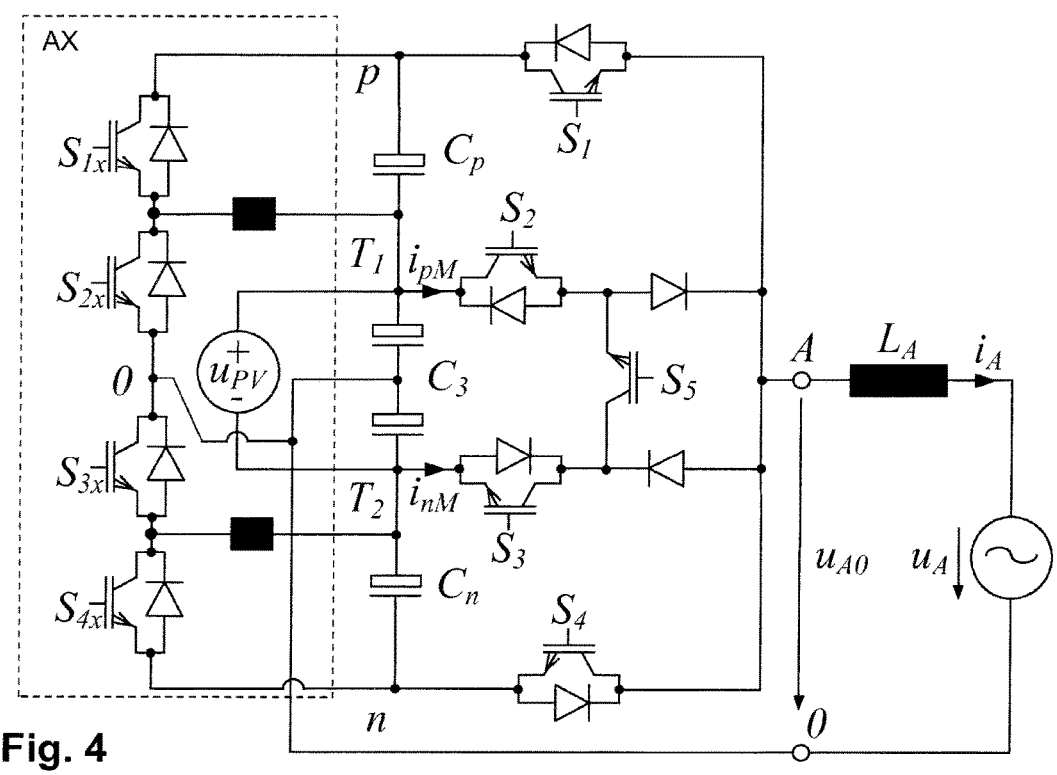
FIG. 4 depicts the proposed four-level converter circuit in a photovoltaic (PV) application.
Figure 5:
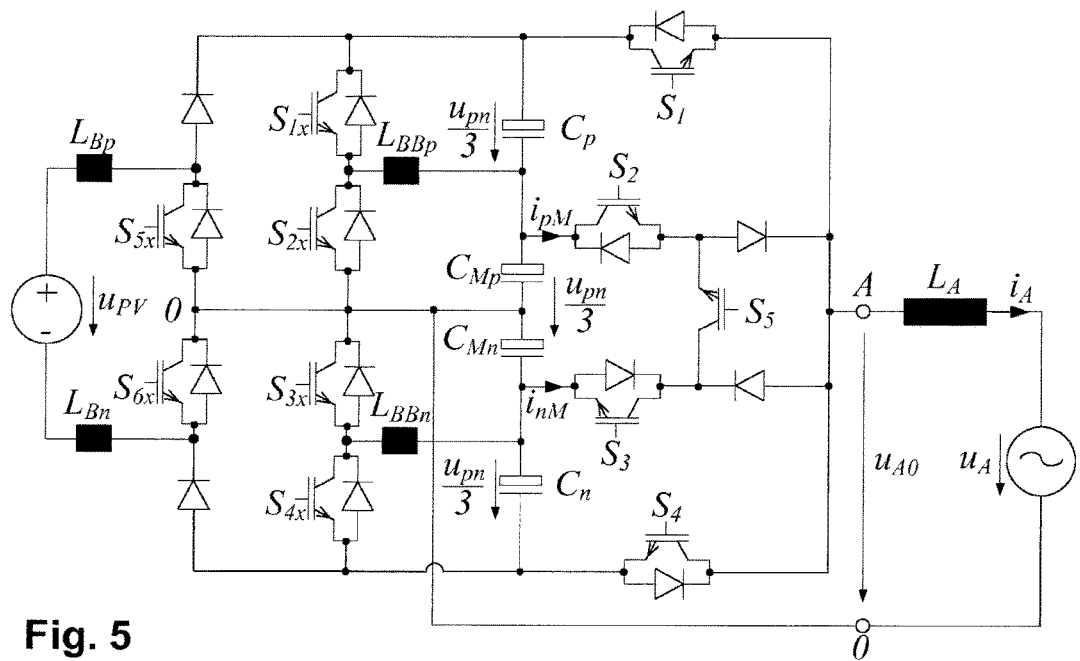
FIGS. 5 to 8 depict alternative embodiments in PV applications.
Figure 6:
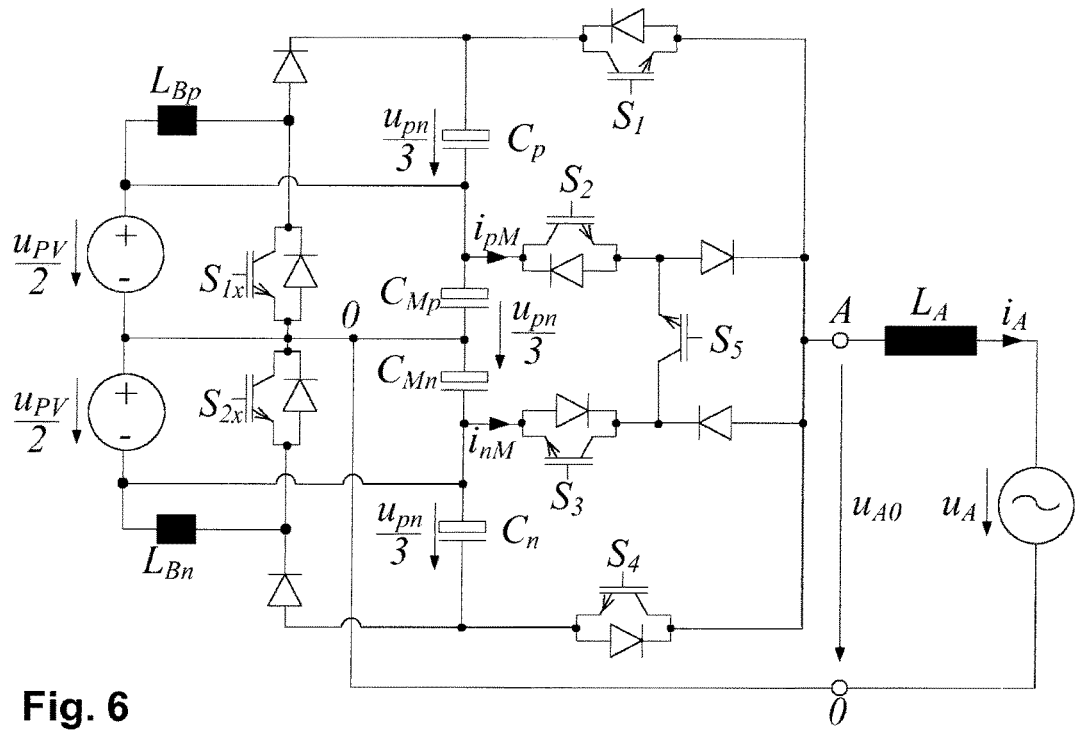
Figure 7:
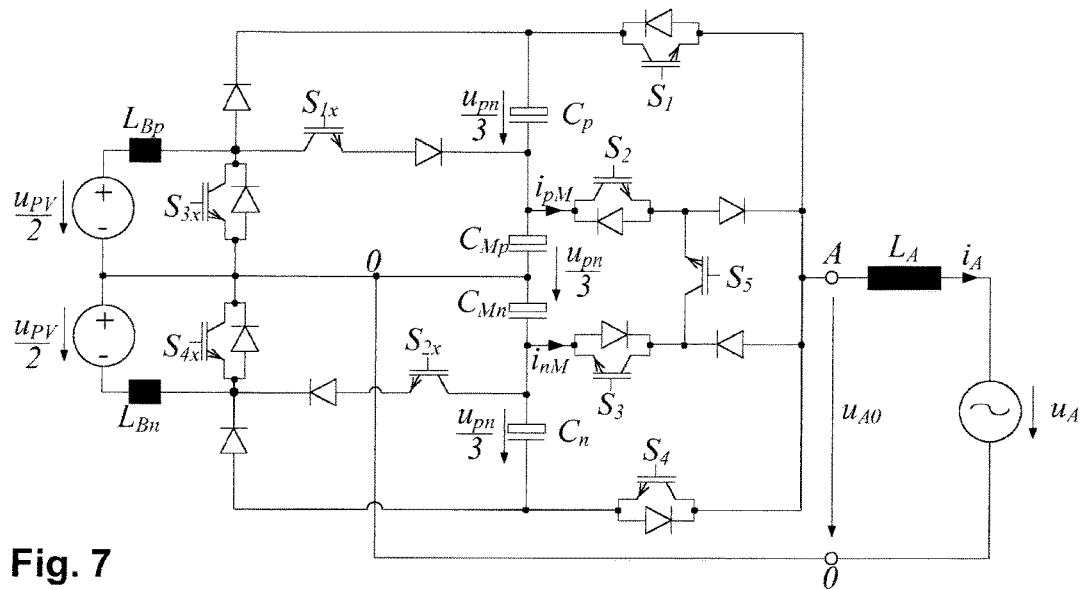
Figure 8:
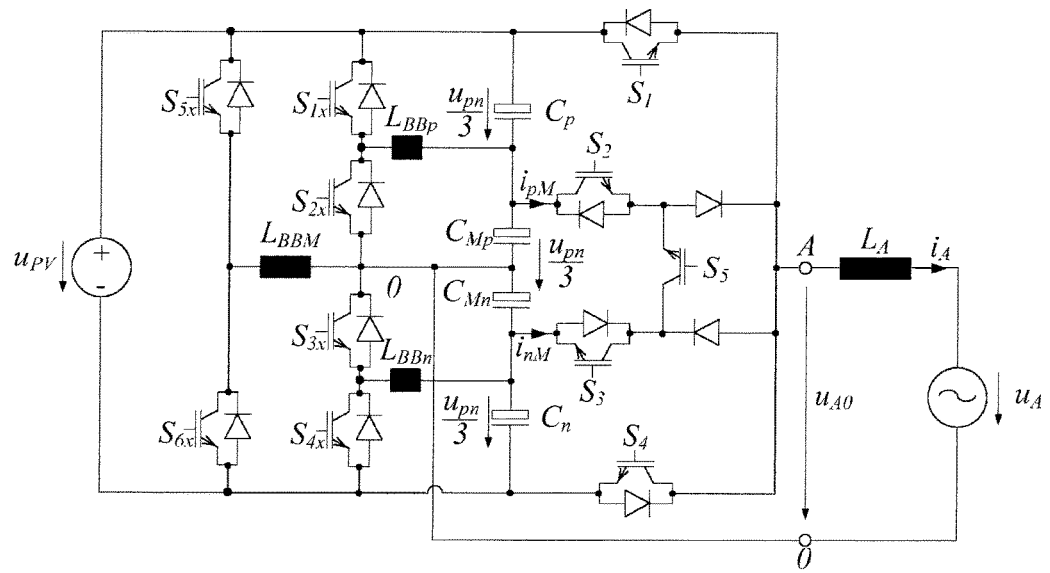

FIG. 4 depicts the proposed four-level converter circuit in a photovoltaic (PV) application including a PV source of voltage $u_{pv}$. The PV source is connected to intermediate terminals $T_1$, $T_2$ of the DC link of the converter. An auxiliary circuit AX including a DC-DC converter stage with four controlled semiconductor switches $S_{1x}$ to $S_{4x}$ is connected, via suitable inductors, to the PV source and to the DC terminals p, n of the converter. Connecting the PV source to the intermediate terminals of the DC-link mitigates the problem of asymmetric power consumption from the DC-link capacitors $C_p$, $C_{Mp}$, $C_{Mn}$, $C_n$ when operating with full power factor. In such case a DC current component across ipM and iMn will otherwise be drained by the AC load and generate voltage unbalances across the DC-link capacitors. An alternative auxiliary circuit may include dividing the PV source voltage and connecting, additionally, a PV source voltage midpoint to the capacitor connection point $C_3$ defining an intermediate voltage level of the converter. On the other hand, operating the proposed four-level converter with zero power factor as in static synchronous compensator (Statcom) applications does not give rise to asymmetric power consumption in the first place.

FIG. 5 to FIG. 8 depict alternative embodiments of the proposed four-level converter circuit in PV applications, each employing auxiliary circuits including a DC-DC converter for improved DC-link capacitor voltage balancing.

Figure 9:
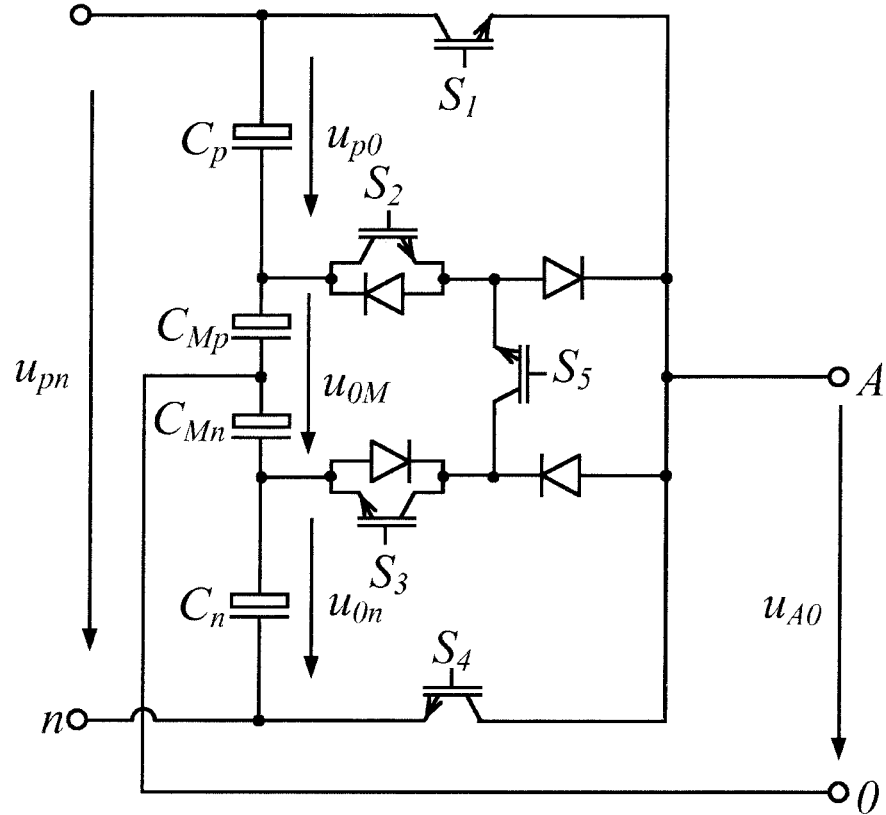
FIG. 9 depicts the implementation of a unidirectional four-level inverter.
Figure 10:
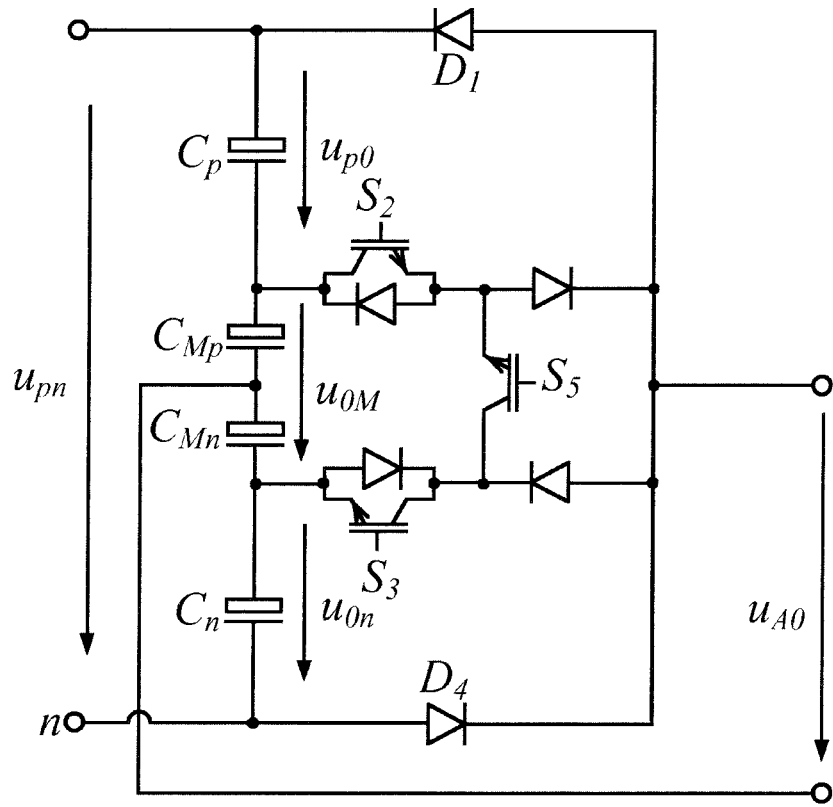
FIG. 10 depicts the implementation of a unidirectional rectifier.

FIG. 9 depicts the implementation of a unidirectional four-level inverter and FIG. 10 depicts the implementation of a unidirectional rectifier. In FIG. 9, the switches $S_1$ and $S_4$ are devoid of a parallel diode, whereas in FIG. 10, the switches $S_1$ and $S_4$ have been eliminated, and only diodes $D_1$ and $D_4$ have been retained.

Figure 11:
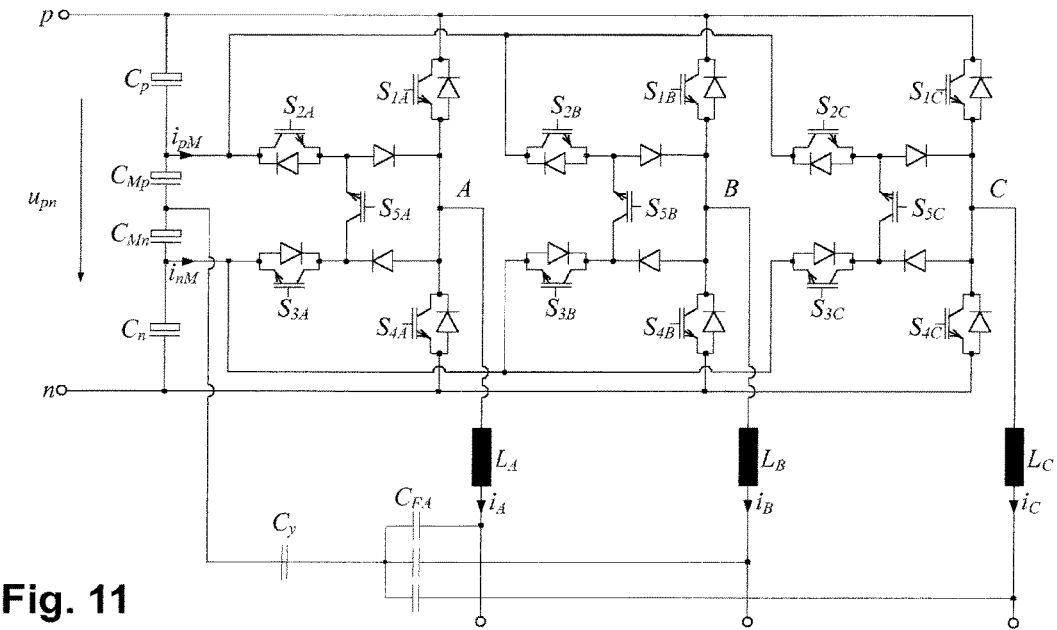
FIGS. 11 and 12 depict a three-phase converter with reduced common-mode noise emission.
Figure 12:
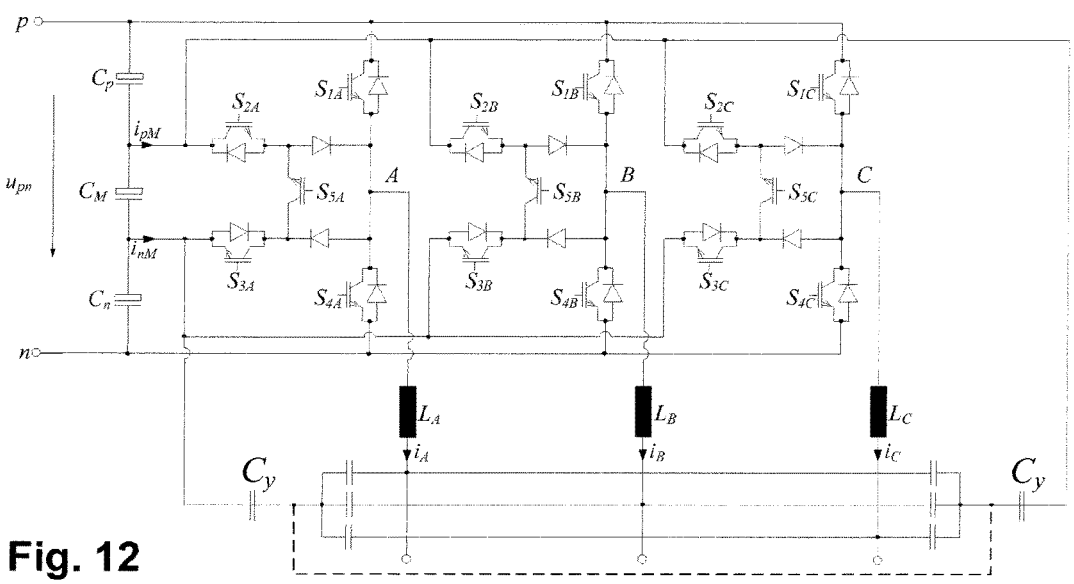

FIG. 11 and FIG. 12 depict each a three-phase four-level converter with reduced common-mode noise emission to the grid. In FIG. 11, the capacitor $C_y$ is optional, while in FIG. 12, the dashed connection between the two capacitors $C_y$ is optional.

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:
1. A four-level power converter with a series connection of capacitors ($C_p$, $C_{Mp}$, $C_{Mn}$, $C_n$) connecting a first and a second input DC terminal (p, n) and defining a first and a second DC intermediate terminal ($T_1$, $T_2$), and with a single-phase bridge comprising a first converter branch connecting the first input terminal (p) to a load terminal (A);

a first intermediate branch including a first controllable switch ($S_2$) and a first diode ($D_1$), which are interconnected with each other at a first connection point ($C_1$) and which connect the first intermediate terminal ($T_1$) to the load terminal (A);

a second converter branch connecting the load terminal (A) to the second input terminal (n);

a second intermediate branch including a second controllable switch ($S_3$) and a second diode ($D_2$), which are interconnected with each other at a second connection point ($C_2$) and which connect the load terminal (A) to the second intermediate terminal ($T_2$); and a controllable interconnect switch ($S_5$) to connect the second connection point ($C_2$) to the first connection point ($C_1$);

wherein the first converter branch, the first intermediate branch, the second converter branch and the second intermediate branch are directly interconnected at the load terminal.

2. The four-level converter as claimed in claim 1, wherein the first and second converter branch each include a controllable switch ($S_1$, $S_4$).

3. The four-level converter as claimed in claim 1, wherein the first and second converter branch each include a diode.

4. The four-level converter as claimed in claim 1, wherein each of the first and second converter branch include solely one controllable switch ($S_1$, $S_4$) and/or solely one diode.

5. The four-level converter as claimed in claim 1, wherein a diode interconnects the first connection point ($C_1$) to the second connection point ($C_2$) in antiparallel to the controllable interconnect switch ($S_5$).

6. The four-level converter as claimed in claim 1, wherein the first controllable switch ($S_2$) and the controllable interconnect switch ($S_5$) are supplied by the same gate drive power supply.

7. A three-phase power converter for bi-directional power exchange with a power grid, with three single-phase bridges of a four-level converter as claimed in claim 1 and with all three single-phase bridges connected in parallel to a DC link of the three-phase converter.

8. The four-level converter as claimed in claim 1, wherein the first intermediate branch comprises a further diode connected antiparallel to the first controllable switch ($S_2$) and/or connected in reverse direction to the first diode;

wherein the second intermediate branch comprises a further diode connected antiparallel to the second controllable switch ($S_3$) and/or connected in reverse direction to the second diode.

9. The four-level converter as claimed in claim 8, wherein the first controllable switch ($S_2$) and the controllable interconnect switch ($S_5$) are supplied by the same gate drive power supply.

10. The four-level converter as claimed in claim 1, wherein the first and second intermediate branches include solely the first controllable switch ($S_2$) and the second controllable switch ($S_3$) as controllable switches.

11. The four-level converter as claimed in claim 10, wherein the first intermediate branch comprises a further diode connected antiparallel to the first controllable switch ($S_2$) and/or connected in reverse direction to the first diode;

wherein the second intermediate branch comprises a further diode connected antiparallel to the second controllable switch ($S_3$) and/or connected in reverse direction to the second diode.

12. The four-level converter as claimed in claim 10, wherein the first controllable switch ($S_2$) and the controllable interconnect switch ($S_5$) are supplied by the same gate drive power supply.

13. The four-level converter as claimed in claim 1, wherein, in the first intermediate branch, the first controllable switch ($S_2$) and the first diode ($D_1$) are connected in series and provide the first connection point ($C_1$) between them;

wherein, in the second intermediate branch, the second controllable switch ($S_3$) and the second diode ($D_2$) are connected in series and provide the second connection point ($C_2$) between them.

14. The four-level converter as claimed in claim 13, wherein the first branch, the first intermediate branch, the second branch and the second intermediate branch are interconnected at the load terminal.

15. The four-level converter as claimed in claim 13, wherein the first and second intermediate branches include solely the first controllable switch ($S_2$) and the second controllable switch ($S_3$) as controllable switches.

16. The four-level converter as claimed in claim 13, wherein the first intermediate branch comprises a further diode connected antiparallel to the first controllable switch ($S_2$) and/or connected in reverse direction to the first diode;

wherein the second intermediate branch comprises a further diode connected antiparallel to the second controllable switch ($S_3$) and/or connected in reverse direction to the second diode.

17. The four-level converter as claimed in claim 13, wherein the first controllable switch ($S_2$) and the controllable interconnect switch ($S_5$) are supplied by the same gate drive power supply.

* * * * *